June 15, 1943. J. FODOR 2,322,008

DISPLAY SYSTEM

Filed July 18, 1939 7 Sheets-Sheet 1

Inventor
Joseph Fodor
by
Stone, Boyden & Mack.
Attorneys.

Fig. 3.

June 15, 1943.  J. FODOR  2,322,008
DISPLAY SYSTEM
Filed July 18, 1939  7 Sheets-Sheet 4

Joseph Fodor Inventor
by Stone, Boyden & Mack
Attorneys.

June 15, 1943.  J. FODOR  2,322,008
DISPLAY SYSTEM
Filed July 18, 1939  7 Sheets-Sheet 5

Inventor
Joseph Fodor
by Stone, Boyden & Mack
Attorneys

June 15, 1943.   J. FODOR   2,322,008
DISPLAY SYSTEM
Filed July 18, 1939   7 Sheets-Sheet 6

Inventor
Joseph Fodor
by
Stone, Boyden & Mack
Attorneys.

June 15, 1943.  J. FODOR  2,322,008
DISPLAY SYSTEM
Filed July 18, 1939  7 Sheets-Sheet 7

Inventor
Joseph Fodor
by
Stone, Boyden & Mack
Attorneys.

Patented June 15, 1943

2,322,008

UNITED STATES PATENT OFFICE 2,322,008

DISPLAY SYSTEM

Joseph Fodor, London, England

Application July 18, 1939, Serial No. 285,178
In Great Britain July 19, 1938

17 Claims. (Cl. 177—346)

The present invention relates to advertising and like luminous display systems, and particularly to display systems comprising luminous electric discharge devices, such as neon tubes, and has for its object to provide a display system particularly for use in shop windows, showcases, showrooms, stalls, exhibition stands or the like.

In the specifications of my prior British Patents Nos. 462,022 and 464,023 I have described display systems employing luminous electric discharge devices which are fed by high frequency current, and in which the display devices are in the form of letters, numerals or symbols which may be readily interchanged to build up any desired display. Such devices have disadvantages when used in shop windows or the like, due to the fact that it is always necessary to have within the view of the public a specially constructed supporting base, which still has to be employed in its same form when the shop window is redressed unless the base part is remodelled for the fresh display to be made.

The present invention provides a display system in which it is not necessary to employ a special supporting base for the luminous electric discharge devices, it being only necessary to employ within the visible parts of the shop window, showcase or the like, the discharge devices, which may, if desired, be mounted on a ticket or card, the said discharge devices being positioned at any desired parts of the window or the like or attached to the articles of commerce displayed therein, and being caused to become illuminated by an electric field produced within the window or the like. The electric field is preferably a high frequency electric field which is produced by one or more conductors which are fed with high frequency energy from a high frequency generator. The high frequency generator may be arranged out of sight and the conductors may also be positioned so as to be outside the field of vision, or may be employed in or comprise the wall surfaces, or furnishings or appurtenances commonly used in shop windows for the display of articles of merchandise. Such furnishings or appurtenances may comprise the usual metallic display stands or supports, or display stands or supports of insulating material provided with conductors on their surface or embedded therein, to which the high frequency energy is fed either directly or capacitatively, so that by placing one or more luminous electric discharge devices within the high frequency field created by the stand or the conductors thereon the discharge devices may be caused to glow.

From one aspect the invention comprises a display system for a shop window, a showcase, a stall or a showroom, wherein the bottom of the window or the showcase, or the supporting surface of the stall, or the floor of the showroom, comprises at least in part an electrically conducting panel, either in the form of a conducting plate, a network or grid of conducting wires or strips, wire gauze or the like, and wherein a high frequency generator is provided, the high frrequency current from which is fed to said conducting panel whereby one or more luminous electric discharge devices may be illuminated by placing them within the high frequency field created by said panel. An object of the invention is to provide an improved construction of such a panel. In order to extend the high frequency electric field some distance above the conducting panel and without increasing the output of the high frequency generator, one or more electrical conductors may be provided which extend upwardly above the conducting panel and are either directly coupled thereto or positioned so as to be capacitatively coupled thereto, whereby the high frequency field is also produced in the vicinity of said conductors so that one or more luminous electric discharge devices will become illuminated when positioned in the field of said conductors. Such upwardly extending conductors may comprise the display stands or may be embodied in the framework of a showcase.

Metallised cloth, textile material having metallic conductors interwoven therein or having metallic conductors secured to the surface thereof, or other flexible conducting material may also be used as the conductor to which the high frequency current is fed for producing the high frequency electric field. A feature of the invention, therefore, consists in a display system for a shop window, showcase or the like, wherein the shop window or the like is draped with drapings embodying or comprising one or more electric conductors to which high frequency electrical energy is fed, and wherein one or more luminous electric discharge devices are positioned within the high frequency field created by said conductors so that the said discharge device or devices is/are energised to luminosity by said field.

A still further feature of the invention consists in the provision of a fixed or variable tuned oscillatory circuit in the base of the display stand.

showcase, price ticket or the like. The oscillatory circuit may be provided with manual tuning means and may be arranged to be pre-set to a desired frequency. In this way the oscillatory circuit may be tuned to the frequency of the generator or one of its harmonics, and thereby the field for energising the discharge tubes may be increased.

In order that the invention may be more clearly understood reference will now be made to the accompanying drawings which show various embodiments according to the invention, by way of example, and in which.

Figure 1:
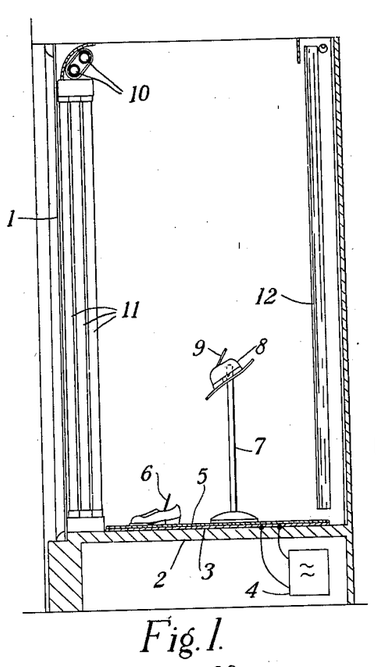
Fig. 1 shows a section through a shop window electrified by the system according to this invention.

Referring to Fig. 1, the shop window comprises the usual glass window 1 and base 2. Upon the base 2 is arranged a conducting panel 3, which comprises a plurality of conducting elements, which in turn is covered by a layer 5 of carpet, linoleum or other covering. The conducting panel is fed with high frequency current from the high frequency generator 4. The high frequency generator may be arranged beneath the base 2 of the shop window or at any desired remote point, and may comprise a vacuum tube oscillator or any other suitable high frequency generator such as an alternating current generator or Tesla coil.

The conducting panel produces a high frequency field extending therearound, which field will cause a lamp, such as a luminous electric discharge tube positioned in the vicinity thereof, to glow. Such a tube is indicated at 6 as a price ticket for a shoe. In order to extend the range of the field to a greater height above the surface of the panel 3 than would otherwise be possible without increasing the output of the generator, I employ the usual metallic display stands 7 which are stood upon the layer 5 and serve to support the article to be displayed, such as the hat 8. The high frequency current is fed to the metallic display stand 7 due to the capacitive coupling between the base thereof and the conductors in the panel 3 whereby an electric field is created around the display stand to illuminate a discharge lamp 9 serving as the price ticket on the hat 8.

Similar conducting panels may be arranged at the sides and back of the shop window, thereby increasing the area of the enclosed space within which the electric field is produced. For the back and side conducting panels use may be made of metallised cloth or textile material having metallic conductors interwoven therein, which may be arranged as a curtain 12. Further discharge devices may be carried by the curtain to provide an illuminated display or decorative effect.

The general illumination of the window may also be effected by luminous electric discharge tubes fed from the high frequency current. Banks of such tubes are shown at 10 and 11. These tubes may also be fed capacitatively from the field producing conductors, although since it is seldom desired to alter the position of the general lighting units these may, if desired, be directly fed from the generator by directly connecting the internal or external electrodes of the discharge tubes to the generator output.

The conducting panel 3 may comprise a continuous metal conductor or wire gauze, but preferably comprises two groups of conductors such as two interleaved groups of conducting wires or strips, the respective groups being connected to the output terminals of the generator. The conducting wires or strips may be arranged in parallel fashion, alternate strips being electrically connected together.

In order to increase the coupling between the base of a display stand and the conducting panel the base part of the display stand is also provided with a plurality of strips or other conductors arranged in substantially the same relation as the conductors in the panel 3, for example, they may be arranged parallelly and spaced apart about the same distance as the conductors in the panel 3. Alternate conductors in the base of the display stand are electrically connected together and fed to the conductors in the display stand as will be more fully hereinafter described.

Preferably the conducting panel comprises a plurality of electrodes of any desired shape, square, round or hexagonal, which are arranged in a plurality of rows, the electrodes being electrically interconnected in rows either longitudinally or diagonally, the alternate rows being also electrically interconnected. The electrodes should be so positioned that the electrodes in one row are arranged in zig-zag fashion with respect to the electrodes in the next adjacent rows. Two such arrangements are more particularly shown in Figs. 2 and 3 in which the electrodes 15 are substantially square in shape and interconnected by conducting link portions 16. In the arrangement shown in Fig. 3, the rows are arranged diagonally, whereas in the arrangement shown in Fig. 2 the rows are arranged longitudinally. As will be seen alternate rows are also electrically interconnected by conductors 17 and 18. The electrodes and conducting links may comprise pieces of metal, or may be painted or otherwise applied to the floor or the underside of the floor covering. Preferably, however, the electrodes are positioned between two sheets of flexible insulating material such as rubber, thus constituting a mat which may be made in any desired length or size and simply be cut to the desired length in accordance with particular requirements. As shown in Fig. 4 such a mat may comprise two layers of sheet rubber 19 and 20 with the electrodes 15 positioned therebetween. The electrodes and connecting link portions may be painted, printed, electrolytically deposited or otherwise applied to the surface of one sheet of rubber and be subsequently covered by the second sheet of rubber. Since metallic paints as usually marketed are not good electrical conductors, metal powder is preferably printed on to the surface of the rubber, or the surface is coated with adhesive where the electrodes are to be applied and subsequently sprinkled or sprayed with metallic powder. If desired, a further layer of adhesive may then be coated over the electrodes in order to assist in the adhesion and to secure the two layers of rubber together. The connecting links between the electrodes may be formed in like manner, the various rows thus formed being alternately interconnected by connecting strips or wires 17 and 18 arranged along the edge or edges of the mat.

Alternatively, the electrodes and conducting links may be stamped from metal foil, such as a metal foil on paper.

Since aluminium attacks rubber, the provision of a layer of adhesive between the faces of the electrodes and the rubber serves the dual purpose of preventing attack and securing the plates together. If aluminium foil is used, it should be covered with paper or other suitable material on both surfaces.

The two groups of electrodes are connected respectively to the terminal members 21 and 22 extending out at suitable parts of the mat.

The conducting mat may be cemented to the underside of a carpet, linoleum or other floor covering and may thus be constructed in the form of small mats or large carpets for positioning on the base of the shop window or over the floor of a showroom.

The base of support for a luminous discharge lamp or the display stand is also preferably provided with a plurality of electrodes of a similar size and correspondingly positioned and interconnected or arranged as the electrodes in the mat, whereby whatever the position the base part is placed upon the mat the desired electrostatic coupling is obtained. A standardised base plate may be constructed with electrodes disposed so as to correspond to those in the mat and be provided with sockets, grooves or the like adapted to receive the lamp or supporting members of a display stand, for example the sides or ends of plates, rods or other display members of glass or other material or adaptors therefor and automatically to connect the electrodes in the base part to the display members supported by the base.

Figures 2, 26, 27:
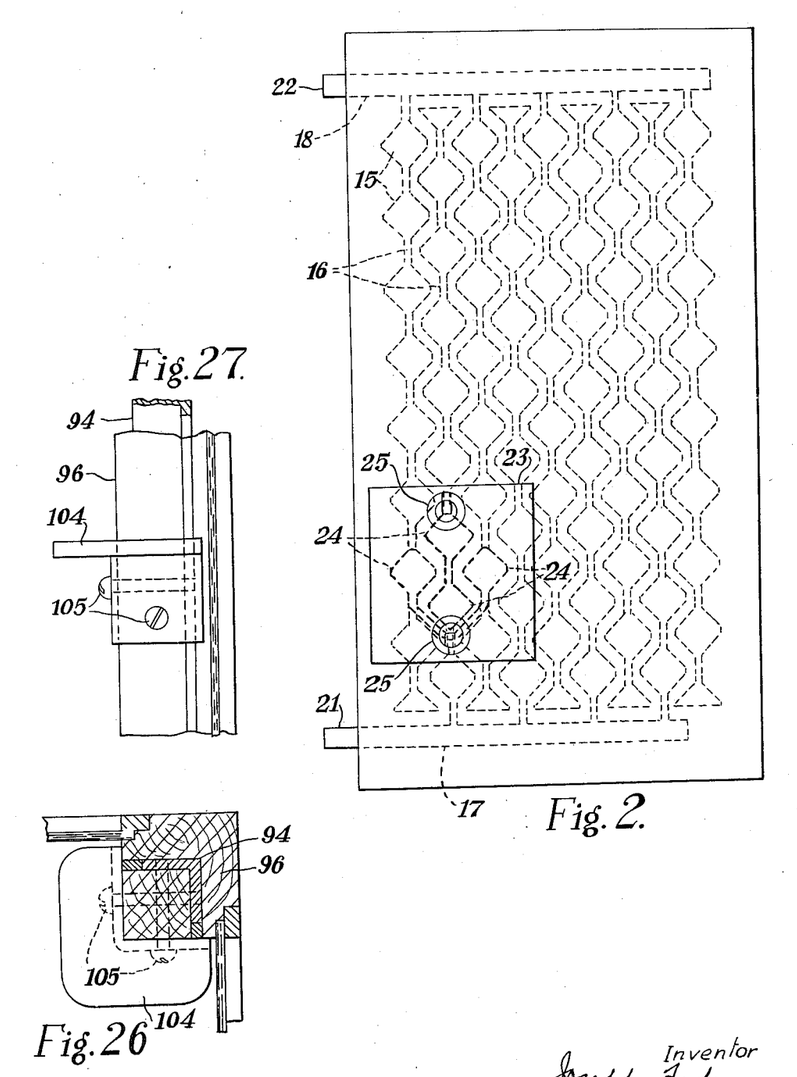
Figs. 2 and 3 show two arrangements of the electrodes for producing the electric field.
Figs. 25, 26 and 27 show details of the showcase construction.
Figure 3:
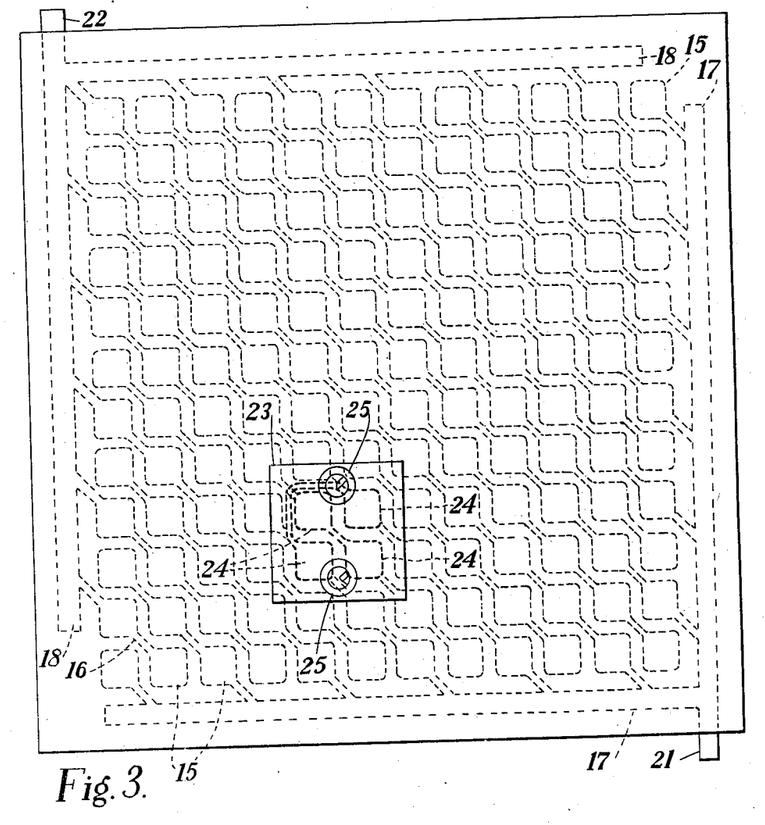
Figure 4:
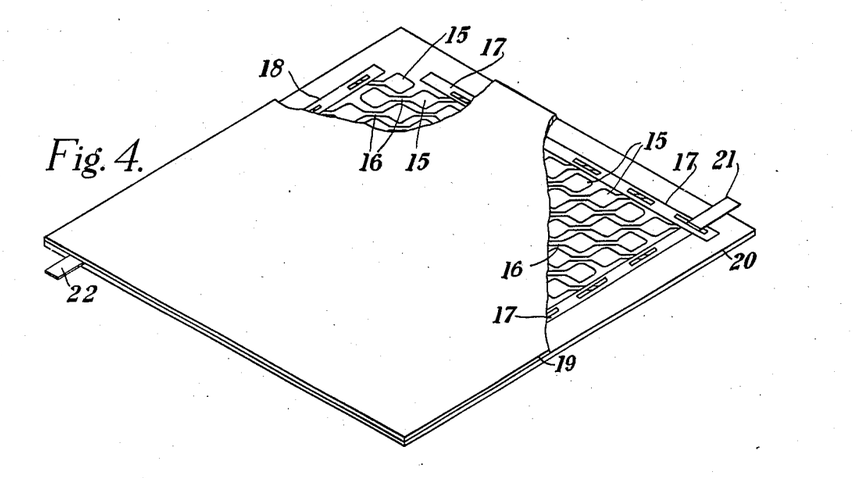
Fig. 4 shows a mat comprising the electrodes for producing the electric field.
Figure 5:
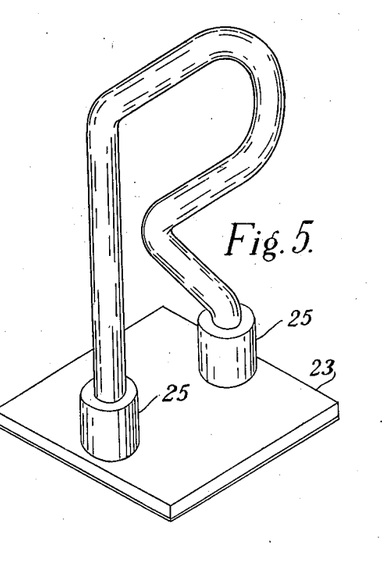
Fig. 5 shows a display device mounted on a supporting base.
Figure 6:
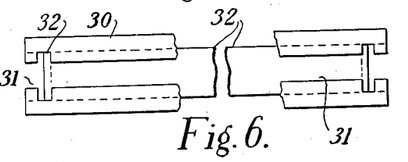
Figs. 6 and 7 show the construction of a supporting plate for use as part of a display stand.
Figure 7:
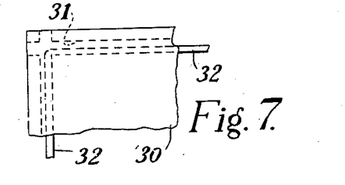

The arrangement of a base part for directly supporting a luminous electric discharge tube moulded into the form of a letter or sign is also shown in Figs. 2 and 3 and also in Fig. 5. The base comprises a plate 23 of insulating material, the underside of which is provided with four electrodes 24 electrically interconnected in pairs and the pairs connected respectively to the conducting linings of the sockets 25 made of insulating material arranged on the upper surface of the plate. The discharge tube is supported by inserting its ends in the sockets 25. Thus the electrodes 24 may be positioned to substantially register with the electrodes 15 of the mat, as shown in the drawings.

Plates of glass or other transparent or opaque insulating material are often used in building up a window display and by providing conductors along or adjacent the edges thereof, for example by painting the edges with colloidal graphite or silvering the edges, the high frequency current may be fed around the glass plates to produce a high frequency electric field in the vicinity thereof. A display may be built up using several of such plates, the usual metallic clips provided for securing the glass plates together effecting the coupling or connection between the conductors at the edges of the various glass plates. The lowermost glass plate is preferably supported in a conducting base part, which base part is either directly connected to the high frequency generator or is capacitatively coupled to the conductors or the like arranged at the base of the shop window to which the high frequency current is fed.

The conductors may extend completely around the edges of the plates, or, alternatively, may be divided into two or more parts which may be coupled or connected to the output terminals of the high frequency generator, or the conductors to which the high frequency current is capacitatively fed. Instead of forming the conductors on the edges of the glass plates, they may be formed on the main surface of the plate.

Figure 8:
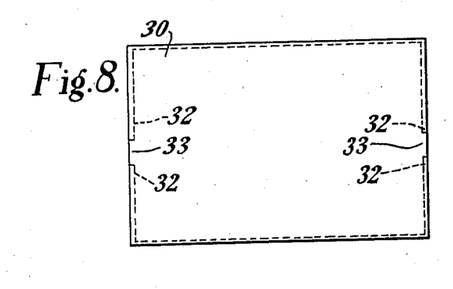
Figs. 8 and 9 show two methods of arranging the electrodes in such a supporting plate.
Figure 9:
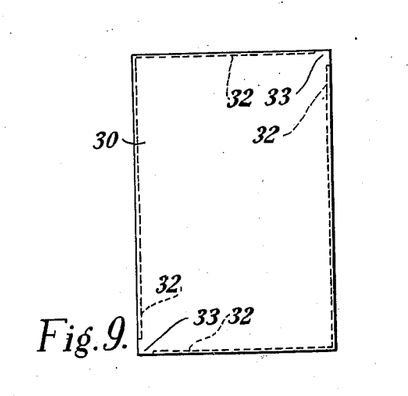

Preferably, however, the plates of glass or other material are provided with grooves or recesses, preferably cut around their edges, within which the conductors for producing the field are arranged so that they cannot be touched accidentally. Instead of cutting the groove the plate may be built up of three or more superposed layers to form the groove. Transparent plates according to this invention are shown in Figs. 6 to 9, in which the groove 31 cut around the edge of the insulating plate 30 accommodates the conductor 32. The conductors arranged in the groove may be deposited therein or, as shown in the figures, may comprise metal strips which are held in position by fitting within the T-shaped groove cut in the edge of the plate. The conductors are preferably in two parts having spaces 33 between the ends of the conductors arranged either at the middle of two opposite sides as shown in Fig. 8 or at two diagonally opposed corners as shown in Fig. 9. The particular position of the spaces 33 depends upon the purpose for which the plates are to be used as will be more fully hereinafter described.

Figure 10:
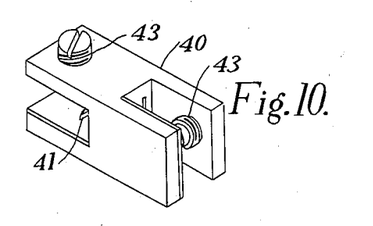
Fig. 10 shows a perspective view of a clip for securing the supporting plates together.
Figure 11:
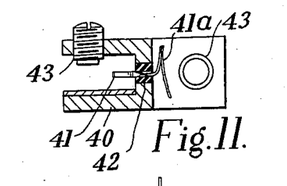
Fig. 11 shows a section through the clip shown in Fig. 10.
Figure 12:
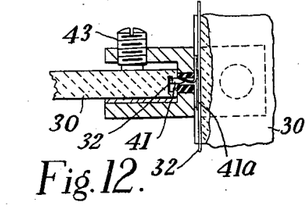
Fig. 12 shows a similar section with the supporting plates in position.

The various plates may be connected together by mechanical clips or brackets which may be made of insulating material and have metallic conductors (such as spring contacts) arranged therein which conductors automatically make contact with the electrodes arranged around the end of the plate when a clip is secured to the edge thereof and thus interconnect the conductors of adjacent plates. Alternatively, as shown in Figs. 10 to 12 the clips 40 may be of metal and have the contacts 41 carried in insulating material 42 therein. In the embodiment shown two forked portions are shown arranged at right angles to one another with the spring contacts 41 and 41a projecting on opposite sides of the interconnecting wall and being mounted in insulating material 42 in this wall. The glass plates are secured in the respective forks by means of the screws 43. As shown in Fig. 12, when the glass plates 30 are secured in position between the forks the spring contact members 41 engage with the conductors 32 arranged in the grooves cut around the edges of the plate.

It will be understood that the clip or bracket shown in Figs. 10 to 12 is only shown by way of example and that the angular relationship between the forked portions of the clip and the number of forked portions will depend upon the number of glass plates to be supported and the relative positions in which they are to be arranged.

Figure 16:
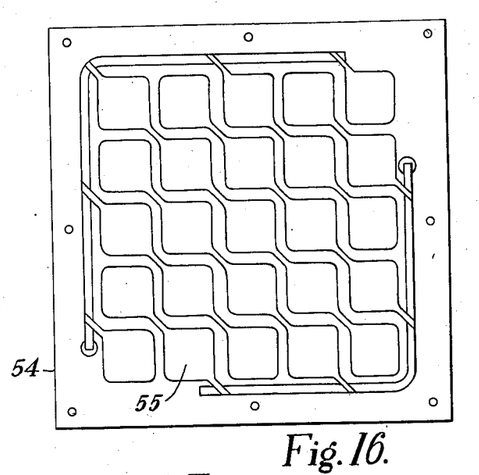
Fig. 16 shows a plan view of the electrode arrangement at the bottom of the base part.

Figs. 13 to 16 show a standard base part for supporting such glass plates. The base part comprises a moulding of insulating material 50 which is made with walls 51 and 52 extending partly above and below and around the entire periphery of the plate portion 53 thus forming two hollow compartments. The bottom compartment is closed by a layer of insulating material 54 which carries the electrode elements 55 arranged as shown in Fig. 16, to correspond with the electrode elements of the mat, so that they may register therewith, in the same manner as illustrated in Figs. 2 and 3. The upper compartment is closed by a sheet of insulating material 56 which carries a channel member 57 for accommodating the edge of a glass plate. This channel member, which may be made of metal, is provided with the screws 58 for securing the glass plate therein, and carries two spring contacts 59 and 60 mounted in insulating material 61, which contacts are adapted to engage with the two conductors of a glass plate such as shown in Fig. 8, when inserted in the base part. In order to increase the field produced by the conductors around the glass plates, the base part also accommodates an oscillatory circuit tuned to the frequency of the generator or one of its harmonics. The compartments in the base part are provided for accommodating the elements of the oscillatory circuit, one of which accommodates a condenser and the other an inductance, which may conveniently be of the basket type. The electrodes at the base of the base part are connected to the oscillatory circuit, the output of which is connected to the contacts 59 and 60.

Means may be provided for adjusting the tuning of either or both the condenser and/or the inductance.

Figures 13, 17:
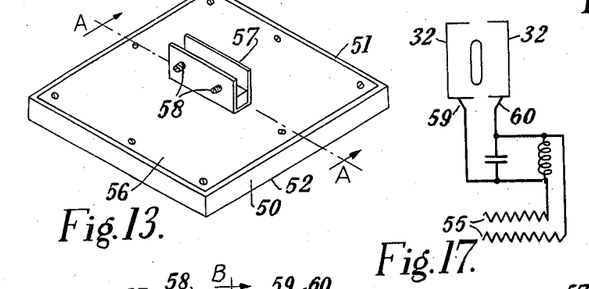
Fig. 13 shows a perspective view of a standard base part for a display stand.
Figs. 17 and 18 show two alternative arrangements for the oscillatory circuit in the base part.
Figure 14:
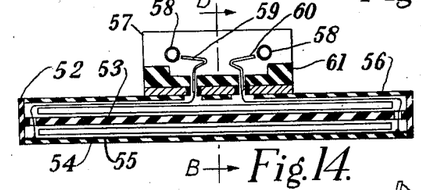
Fig. 14 shows a section through the base part along the line A—A of Fig. 13.
Figure 15:
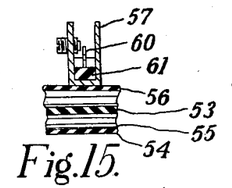
Fig. 15 shows a section through the channel member along the line B—B of Fig. 14.
Figure 18:
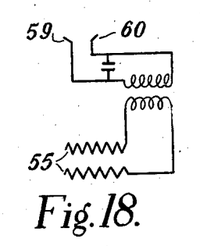

The oscillatory circuit may be directly coupled to the pick-up conductors in the base part; for example, a parallel connected oscillatory circuit may have the two ends of the inductance connected to the two groups of pick-up electrodes, leads also extending from the two ends of the inductance to the field producing means as shown in Fig. 17. Alternatively, the oscillatory circuit may be coupled aperiodically to the pick-up electrodes, for example through a transformer, the secondary of which constitutes the oscillatory circuit and feeds the field producing means as shown in Fig. 18.

If desired, instead of making the bottom of the base part fixed, it may be adjustable to vary the spacing between it and the electrodes in the mat whereby the coupling between the base part and the electrodes in the mat may be varied. Alternatively, standard base parts may be made with different numbers of pick-up electrodes for the same purpose of varying the coupling. Or the output may be varied by adjusting the tuning of the oscillatory circuit or the points on the inductance to which the output contacts are connected.

Figure 19:
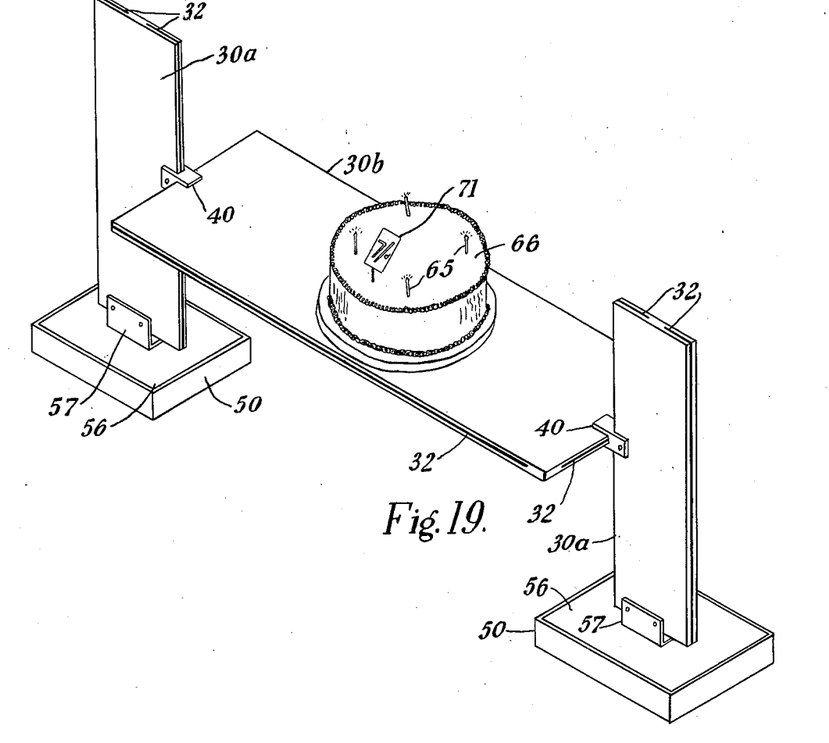
Fig. 19 shows a perspective view of a display device constructed from standard base parts and supporting plates.

The channel member 57 arranged on the standard base part shown is adapted to receive the edges of glass plates so that various display stands may be built up as shown, for example in Fig. 19. This figure shows the use of glass plates as shown in Figures 8 and 9. The horizontal plate 30b has the spaces between its electrodes at the corners as shown in Fig. 19 since in this case the contact of the clip 40 engages with the middle of the side of this plate. The spacing between the two base parts shown in the arrangement of Fig. 19 should be such that one of the conductors around the plate 30b is connected to those electrodes in the left hand base part which are coupled to one group of electrodes in the mat whilst the other conductor around the plate 30b is connected to those electrodes in the right hand base part which are coupled to the other group of electrodes in the mat.

Instead of providing a channel member 57 on the base part, other sockets may be provided thereon to accommodate rods or other elements serving for the display of the articles of commerce. The rods may have a circular, hexagonal or any other desired cross-section and may be made of glass or other insulating material and have the conductors painted on their surface or embedded therein, which conductors are adapted to make contact with the contacts in the stand socket when the parts are secured together. Or adaptors may be provided for fitting in the channel member and having sockets for supporting a discharge tube or other display stand members.

The electric discharge devices 6 or 9 used in the arrangement as described in Fig. 1 may be shaped in the form of letters or figures indicating words or prices and thus comprise display or price tickets. They may be provided with clips, pins, spikes or other similar means for attaching them to the stands or the article of commerce to be displayed. The clips may be arranged to serve as electrodes for picking up the electric field to energise the discharge tubes or may be adapted to engage with the conductors on the glass plates or display members.

Figure 20:
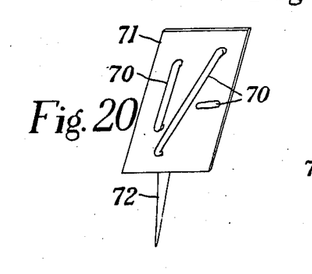
Figs. 20 and 21 show two alternative embodiments of price tickets.
Figure 21:
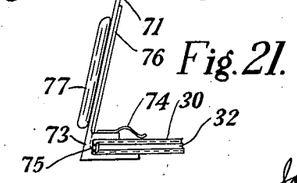

Embodiments of such price tickets are shown in Figs. 20 and 21. In Fig. 20 the discharge tubes 70 are carried by a ticket of insulating material 71 provided with a metallic spike 72 for insertion into meat or a cake as shown in Fig. 19.

Fig. 21 shows an arrangement in which the bottom of the ticket 71 is provided with a forked portion 73 adapted to fit over the edge of a glass plate 30 and be secured by a spring clip 74. The forked portion is provided with a spring contact 75 adapted to engage with the conductor 32 around the edge of the glass plate. This contact 75 feeds a conducting panel 76 of sheet metal, wires or strips, or electrodes as above described to provide a strong field for energising the discharge tubes 77 mounted on the front of the ticket 71.

The price ticket may alternatively be mounted on a base part as described with reference to Fig. 5.

Instead of forming the discharge devices as a complete word or price they may comprise single letters or numerals, preferably of standardised sizes, so that the display or price may be built up from a number of such units by mounting them upon a base part of card, ivorine, metal or other suitable material. The base part is preferably provided with means for interchangeably supporting the discharge devices or may be in the form of a frame within which the discharge devices may be positioned, although if the discharge devices are provided with projections, pins, or the like they may be stuck through the supporting base if it is made of sufficiently soft material. By making the supporting base or frame of metal it assists in concentrating the high frequency electric field in the vicinity of the discharge devices. A further feature of the invention, therefore, consists in a price ticket, display ticket or the like comprising a base part, means for interchangeably mounting thereon one or more luminous electric discharge devices, said base part being provided with a clip, projection, pin, spike or other means for attaching it in a detachable manner to the furnishings or appurtenances or to the article of commerce displayed.

Figure 22:
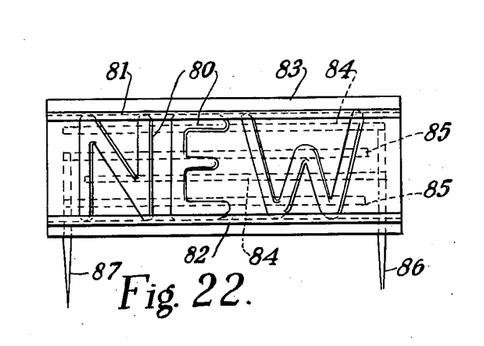
Fig. 22 shows an alternative construction of price ticket with interchangeable letters.
Figure 23:
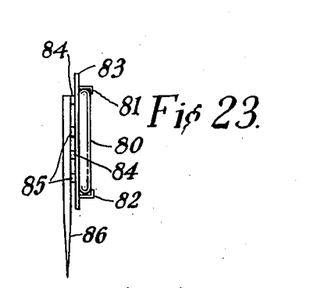
Fig. 23 shows a side elevation of Fig. 22.
Figure 24:
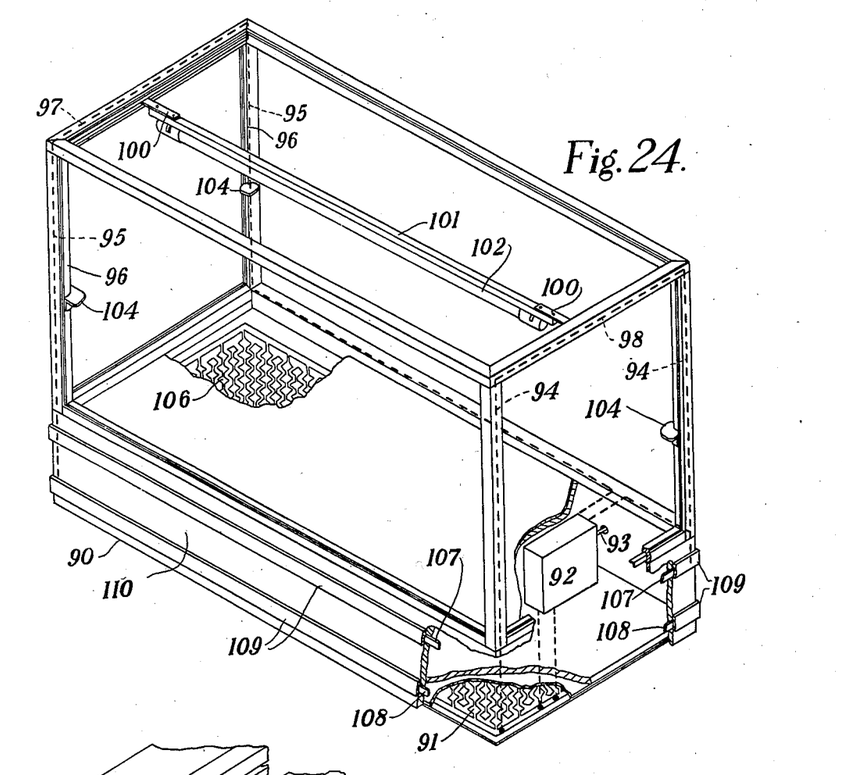
Fig. 24 shows a perspective view of a show case.
Figure 25:
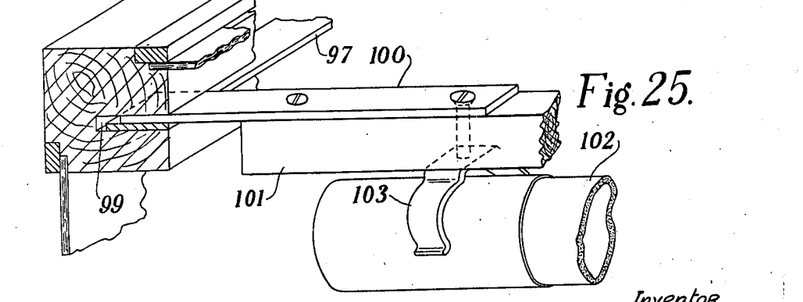

An embodiment of such a ticket is shown in Figs. 22 and 23 in which the discharge tubes 80 are adapted to slide in top and bottom grooves 81 and 82 on the front of the ticket 83. Preferably two groups of conducting strips 84 and 85 are arranged on the rear of the ticket and connected respectively to the spikes or clips 86 and 87.

The discharge devices employed in the system according to this invention may comprise gas or vapour discharge tubes and preferably have no electrodes whatsoever. The tubes may be provided with a coating of fluorescent material and in this case it is not necessary that the electric discharge should emit visible rays since the visible illumination may then be produced by causing the invisible rays to energise the fluorescent material. Lamps having incandescent filaments may also be used in the system according to this invention.

Each lamp or group of lamps may be associated with an oscillatory circuit tuned to the frequency of the high frequency generator or a harmonic thereof, and if the discharge tube is provided with electrodes or a lamp having an incandescent filament is used, the electrodes or the ends of the filaments may be connected to two selected points on the inductance in the oscillatory circuit whereby it is fed with the correct voltage.

Preferably, the frequency of the high frequency generator corresponds to the fundamental or one of the harmonics of the conducting parts connected or coupled thereto. If desired, the fundamental frequency of the conducting elements of the system may be varied by the provision of separate tuning elements.

Two or more different frequencies may be impressed upon the conducting elements whereby, by employing discharge devices provided with oscillatory electric circuits tuned to either one or other of these frequencies, one or other of the groups of lamps may be extinguished by stopping or switching out one or other of the generators. The conducting elements may be fed with two equal frequencies, 180° out of phase, to produce a stationary wave system in the conducting elements.

Switching means may be provided for interrupting the supply of the high frequency current either intermittently or at predetermined times in order to produce a flashing effect; or the high frequency may be cut off from one part of the display and still fed to another part or parts in order to produce varying lighting effects. The lamps may also be movable and means may be provided for automatically effecting their movement preferably in such a way that the lamps pass into and out of the high frequency field in their movement and thus intermittently become illuminated and extinguished. For example, a luminous electric discharge device in the form of a hollow glass sphere may be supported by an upwardly directed jet of water, or it may be impelled repeatedly into the air by a resilient impeller.

Further, the luminous electric discharge devices may form part of an ornament, such as the flame part of the model of a candle 65, so that when the candle models are applied to a cake 66 (see Fig. 19) or the like arranged within the high frequency field the discharge devices are illuminated.

The basic mode of operation of the arrangement according to the invention which has been described in connection with a shop window can also be applied to showrooms, showcases, exhibition stalls or other areas. The object underlying the invention is to provide means for producing an electric field throughout the whole or substantially the whole of the desired space to be electrified so that discharge tubes or lamps positioned within the field will become illuminated without the necessity of making special electrical connections.

In the case of a showroom the mat or other conducting panel may be arranged upon the showroom floor and beneath the carpet or other floor covering. Display stands or the like positioned thereon will then have the high frequency current capacitatively fed to the conducting portion of the display stands. Similarly, showcases may be capacitatively fed from the conductors beneath the floor covering for illuminating lamps for general illumination or advertising purposes arranged within the showcase.

One particular embodiment of a showcase is shown in Figs. 24 to 27 in which the showcase is constructed of wood or other non-conducting material. At the base of the plinth 90 thereof is arranged a pick-up electrode arrangement 91 corresponding to the electrodes positioned under the floor covering. These electrodes are connected as shown in dotted lines to the oscillatory circuit 92 tunable by the member 93 extending outside the plinth, the output leads of which are connected to further conductors 94 and 95 extending upwards through the framework of the showcase as shown dotted in Fig. 24. These further conductors comprise metallic strips of flat or angular cross-section which are fitted beneath a beading 96 (see Figs. 26 and 27) arranged inside the showcase and in an angle formed in the upwardly extending wooden framework thereof. The upper ends of these further conductors are interconnected by horizontal conducting members 97 and 98 which may form one or both walls of a channel 99 formed in the top end rails of the showcase and arranged with the channel positioned horizontally so that the contact portions 100 at the ends of a transverse supporting member 101 for carrying a discharge tube 102 may be slid into the showcase between the two opposing channels and engaging with the conducting portions thereof. The metallic contact portions are electrically connected to the clips 103 for supporting the discharge tube, which clips constitute the external electrodes thereof.

Metallic brackets 104 or further similar channel shaped members may be secured to the framework of the showcase for supporting shelves, the metal screws 105 for securing the brackets or channel members passing through the beading 96 and contacting with the conductors 94 or 95 arranged therebehind (see Figs. 26 and 27). Illuminating tubes may be mounted beneath the shelving and connected to the brackets or channel members in a manner similar to that described above.

Just below or on the upper surface of the plinth is arranged a further mat 106 or arrangement of electrodes similar to the mat, which electrodes are also connected to the output leads of the oscillatory circuit 92, whereby lamps in the form of display signs may be illuminated by placing them upon the base of the showcase. These signs may be carried by base parts also provided with pick-up electrodes positioned and arranged in a manner corresponding to the electrodes in the mat 106 (see Fig. 5) and provided, if desired, with oscillatory circuits. The shelving may be provided with conductors which automatically connect with the metallic brackets or channel members when placed in position. The surface of the shelf may also be provided with an electrode arrangement similar to the mat, which electrodes may be arranged between two layers of glass and may be painted or otherwise applied on the main surface of the glass between the layers.

Around the plinth preferably positioned in recesses therein are arranged two conductors 107 and 108 connected respectively to the output leads of the oscillatory circuit 92, so that by placing a similar showcase adjacent the first a capacitive coupling is effected between the conductors surrounding the plinth of the two showcases with the conductors surrounding the plinth of the first showcase. The conductors may be covered by a beading 109 or other material. The coupling between two showcases may be increased by arranging a strip conductor to extend in corresponding grooves in both showcases, for example in the grooves 110, which conductor may, if desired, make metallic connection with the conductors secured around each showcase. It will be understood that it is not necessary to provide two conductors around the base of the plinth, one conductor is sufficient and more than two conductors may be used if desired. Furthermore, plug and socket members may be provided for metallically connecting the two showcases together, which plug and socket members are positioned at predetermined places whereby the connections are automatically made when two cases are placed together.

The second showcase may also, of course, be capacitatively fed from the conducting panel arranged across the floor of the showroom.

It will be understood that various modifications may be made without departing from the spirit of the invention. For example, the invention is not limited to the use of high frequency current (1000 cycles per second or more) but the electric field might be produced by high tension currents or in other ways, although if high tension currents are used special attention would have to be given to the insulation and protection of the conductors in order to avoid any risks of shock or fire.

I claim:

1. A display system comprising a conducting panel, means for supplying high frequency current to said panel, conductor means unconnected to but inductively coupled with said panel, and the position of which with relation to said panel may be varied as desired, and a luminous electric discharge device, unconnected with said conductor means, the position of which with respect thereto may be varied as desired, and which, when in any position, is energized to luminosity thereby.

2. A display system for a display chamber comprising a horizontally disposed conducting panel supported by the floor of said chamber, means for supplying high frequency current to said panel, a support comprising conductor means unconnected to but inductively coupled with said panel and movable to different positions relative thereto, and a luminous electric discharge device carried by said support but movable with respect thereto, said discharge device being unconnected with said conductor means but energized to luminosity thereby.

3. A display system for a display chamber comprising a horizontally disposed conducting panel supported by the floor of said chamber, means for supplying high frequency current to said panel, a conducting stand unconnected to but inductively coupled with said panel, said stand being supported on but freely movable to any desired position with respect to said panel, and serving to support an article to be displayed in an elevated position with respect to the panel, and a luminous electrical discharge device having means whereby it may be attached to the article to be displayed, said article being freely movable to different positions on said stand, and said discharge device being unconnected with said stand but energized to luminosity thereby.

4. A display system comprising a high frequency electric generator, a conducting panel to which the high frequency electric energy is fed, a layer of insulating material covering said panel, at least one conductor supported by said insulating material and capacitatively coupled to said panel and which may be moved over said insulating material whilst still remaining coupled thereto, and at least one luminous electric discharge device the position of which may be varied with respect to the conductor and which is energised to luminosity by the electric field created by said conductor.

5. A display system comprising a high frequency electric generator, a conducting panel to which the high frequency electric energy is fed, at least one conductor unconnected with but electrically coupled to said panel and of which the position may be varied in relation to the panel whilst still remaining coupled thereto, an oscillatory circuit connected with said conductor, and at least one luminous electric discharge device the position of which may be varied with respect to the conductor and which is energised to luminosity by the electric field created by said conductor.

6. A display system for a display chamber comprising a high frequency electric generator, a conducting panel fed with said high frequency electric energy and arranged outside the normally visible wall surfaces of the chamber, supporting means in the chamber for displaying the articles of merchandise, said supporting means comprising electric conductors, means whereby the conductors of said supporting means are inductively coupled to, but insulated from said panel, a non-conducting article disposed in the chamber on said supporting means and positioned within the electric field created by said conductors, and at least one lamp carried by said nonconducting article and energised to luminosity by said high frequency electric field.

7. A display system as claimed in claim 6, wherein the supporting means are each provided with conducting elements adjacent the base thereof which are connected to the conductors comprised in said supporting means, said conducting elements being unconnected with but disposed adjacent the conducting panel whereby the high frequency electric current is capacitatively transferred to the said conductors.

8. A display system comprising in combination a high frequency electric generator, a conducting panel, means for feeding the output from said high frequency generator to said panel, a display stand freely movable over said panel and having conductors so positioned as to be capacitatively coupled to the conducting panel, said display stand comprising interchangeable members of insulating material having at least one conductor means arranged adjacent the surface thereof, and connecting members detachably securing said interchangeable members together, whereby said members may be built up to form a display stand of any desired shape, said connecting members comprising conducting elements which serve to transfer the high frequency electrical energy fed to a conductor on one member to a conductor on another member, and a luminous electric discharge tube carried by one of said interchangeable members and energised to luminosity by the high frequency electric field produced by the conductor thereof.

9. A display system as claimed in claim 8, wherein at least one of said interchangeable members is carried by a base part in which the interchangeable members fit, contact members in said base part engaging with the conductors on the interchangeable member, and conductors disposed horizontally in the base part and connected to said contact members, said conductors being capacitatively coupled with the conducting panel.

10. A display stand comprising a plurality of interchangeable supporting plates of insulating material each having at least one conductor arranged along an edge thereof, and brackets comprising conductive elements, which brackets serve for interchangeably assembling the plates together mechanically to form the stand and simultaneously effect the electrical connection between the conductors on two adjacent plates secured together by the bracket.

11. A display system comprising a horizontal panel having therein a plurality of interleaved conductors forming a grid, alternate conductors being electrically connected together thus constituting two groups, a high frequency generator having its terminals connected respectively with said groups, a supporting stand freely movable in all directions over said panel and having a base in which are mounted at least two conductors similar to and positioned and arranged in a manner corresponding with the conductors of said panel, so that the conductors in said panel and base may be brought into substantial registry, means insulating the conductors of said base from the conductors of said panel, whereby said sets of conductors are electrically unconnected but capacitatively coupled, conductor means connected with the conductors in said base, and extending upwardly therefrom, and a luminous electric discharge device carried by said supporting stand and energized by the field set up by said conductor means.

12. A display system as claimed in claim 11 in which the electric discharge device is movably mounted on said stand, and which, when in any position thereon, is energized by the field set up by said conducting means.

13. A display system as claimed in claim 11 in which the supporting stand comprises an insulating plate mounted on said base, and in which the conductor means to which the base conductors are connected, extend along opposite edges of said plate.

14. A display system as claimed in claim 11 in which the supporting stand comprises two separate bases, each containing conductors, and in which a horizontal shelf is carried by and between said bases, on which shelf the electric discharge device may be placed in any desired position, and in which the conductor means for setting up the field comprise elements extending along the opposite side edges of said shelf, said elements being connected respectively with conductors in the bases at the opposite ends of the shelf.

15. A display system comprising a panel of insulating material having therein a plurality of separated rows of electrodes, means electrically connecting the electrodes of each row, means electrically connecting alternate rows together, thus forming two interleaved groups, a high frequency generator having its terminals connected to said respective groups, a support having therein two groups of electrodes similar to and positioned and arranged in a manner corresponding with the electrodes of said panel, said support being relatively small and freely movable along the surface of said panel, whereby it may be brought into a number of different positions relative thereto, in each of which positions its electrodes substantially register with some of the electrodes of said panel, thus becoming capacitatively coupled thereto, and a luminous electric discharge device carried by said support and energized by the field picked up from said panel by the electrodes in said support.

16. A display system as claimed in claim 15, in which the electrodes are relatively wide and the connecting means relatively narrow, and the corresponding electrodes of adjacent rows are offset from each other longitudinally of the rows so as to form a zig-zag arrangement.

17. In a display system employing luminous electric discharge devices energized by a high frequency field, and in combination, means for setting up such a field comprising a flexible mat of insulating material adapted to be laid on a supporting surface and containing within itself two separate groups of connected flexible conductors, the conductors of the respective groups being spaced apart and interleaved, a high frequency generator to the terminals of which said groups are connected, a supporting stand freely movable over said mat and having a base containing conductors adapted to register with and become inductively coupled to the conductors in said mat, and a luminous electric discharge device carried by said supporting stand and energized by the field picked up by said base conductors.

JOSEPH FODOR.